United States Patent
Nakazawa et al.

(10) Patent No.: US 7,518,332 B2
(45) Date of Patent: Apr. 14, 2009

(54) BRUSHLESS SYNCHRONOUS MOTOR AND DRIVING CONTROL APPARATUS THEREFOR

(75) Inventors: Toshiharu Nakazawa, Tokyo (JP); Atsushi Ooyama, Tokyo (JP)

(73) Assignee: Ebara Corporation, Tokyo (JP)

( * ) Notice: Subject to any disclaimer, the term of this patent is extended or adjusted under 35 U.S.C. 154(b) by 216 days.

(21) Appl. No.: 11/527,502

(22) Filed: Sep. 27, 2006

(65) Prior Publication Data

US 2007/0075673 A1 Apr. 5, 2007

(30) Foreign Application Priority Data

Sep. 30, 2005 (JP) ............................. 2005-287300

(51) Int. Cl.
*H02P 6/00* (2006.01)

(52) U.S. Cl. .................. 318/712; 318/700; 318/400.01; 318/722; 318/823; 310/162; 310/184; 310/269

(58) Field of Classification Search ................. 310/156, 310/184, 162, 269; 318/712, 700, 400.01, 318/723, 722

See application file for complete search history.

(56) References Cited

U.S. PATENT DOCUMENTS

| | | | | |
|---|---|---|---|---|
| 4,160,925 A | * | 7/1979 | Ishikawa | ..................... 310/160 |
| 4,617,499 A | | 10/1986 | Yuasa | |
| 4,743,825 A | * | 5/1988 | Nashiki | ....................... 318/723 |
| 4,876,491 A | | 10/1989 | Squires et al. | |
| 5,408,153 A | | 4/1995 | Imai et al. | |
| 6,204,584 B1 | * | 3/2001 | Muszynski | ............. 310/156.08 |
| 2005/0035677 A1 | * | 2/2005 | Evans et al. | ............ 310/156.35 |
| 2006/0006744 A1 | * | 1/2006 | Nashiki | ..................... 310/49 R |

FOREIGN PATENT DOCUMENTS

| | | |
|---|---|---|
| JP | 04-183252 | 6/1992 |
| JP | 09-191698 | 7/1997 |
| JP | 09-331695 | 12/1997 |

* cited by examiner

*Primary Examiner*—Rita Leykin
(74) *Attorney, Agent, or Firm*—Westerman, Hattori, Daniels & Adrian, LLP.

(57) ABSTRACT

A brushless synchronous motor is provided in a simple configuration and at a low cost. The brushless synchronous motor comprises a rotor having salient magnets arranged in a circumferential direction, a stator having driving magnetic poles arranged in the circumferential direction, and an exciting coil wound around each driving magnetic pole, where the rotor is made in a non-circular profile. For example, the rotor may comprise a cylindrical body which has at least one flat surface perpendicular to one magnetic pole direction of the rotor, or a cylindrical body having an elliptic profile with a longer diameter in one magnetic pole direction of the rotor. A detector circuit is associated with each of a predetermined number of exciting coils for outputting a detection signal indicative of the impedance of the exciting coil in accordance with the distance between the driving magnetic pole and rotor, to detect a rotating angle of the rotor.

6 Claims, 6 Drawing Sheets

BRUSHLESS SYNCHRONOUS MOTOR AND DRIVING CONTROL APPARATUS THEREFOR

BACKGROUND OF THE INVENTION

1. Field of the Invention

The present invention relates to a brushless synchronous motor which has a rotor in a non-circular profile to enable detection of the position of magnetic poles of the rotor, and a driving control apparatus therefor.

2. Description of the Related Art

Figure 1:
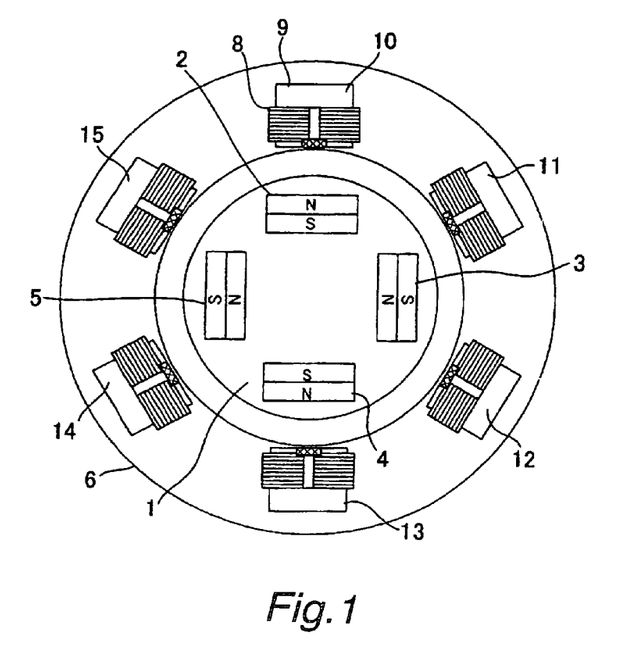
FIG. 1 is a diagram generally illustrating an example of a conventional brushless synchronous motor.

FIG. 1 is a cross-sectional view illustrating a main portion of a conventionally used four-pole brushless synchronous motor. In FIG. 1, a rotor 1 having a circular profile is embedded with four driving salient magnets 2-5 arranged at angular intervals of 90 degrees such that N-poles and S-poles alternate in the circumferential direction. A stator 6 in turn is provided with six driving/position detection units 10-15, arranged at angular intervals of 60 degrees, each comprising a magneto-electric converting element 7 such as a Hall element, an exciting coil 8, and a driving magnetic pole 9, where outputs of the respective magneto-electric converting elements are connected to associated signal converter circuits (not shown). Each driving magnet pole 9, which is in an inverted C shape, has a magnetic pole portion which protrudes toward the rotor and is would with an exciting coil 8.

With the configuration as described above, each signal converter circuit outputs a detection signal indicative of the polarity of a salient magnetic pole and a rotating angle of the rotor in accordance with a positional relationship between the salient magnet and magneto-electric converting element, associated with the rotation of the rotor 1, such that the rotor 1 is driven to rotate in a predetermined direction by controlling the direction of an exciting current through the exciting coil based on the detection signal.

Figure 2:
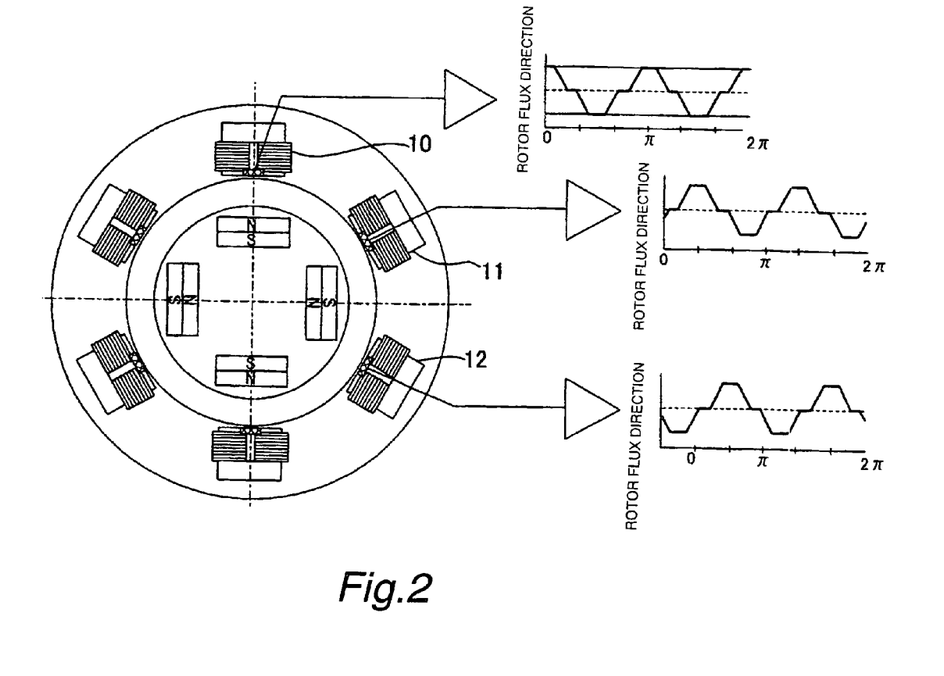
FIG. 2 is a diagram illustrating signal converter circuits connected to three magnetoelectric converting elements in FIG. 1, and detection signals output from the respective signal converter circuits.

FIG. 2 shows, for example, detection signals output from the signal converter circuits connected to the magneto-electric converting elements of three adjacent driving/position detection units 10-12, respectively. As can be seen from the figure, the respective detection signals shift in phase by 60 degrees from one another. The polarity and rotating angle of an associated salient magnetic pole is detected from each of such detection signals, and the rotation of the rotor 1 is controlled by controlling the direction of the excitation current through each exciting coil based on the result of the detection.

Hall elements, for example, can be used for the magneto-electric converting elements shown in FIG. 1, but the Hall elements, which are semiconductor elements, have problems that they present magnetic detection capabilities highly susceptible to ambient temperatures around the elements, and cannot be used under high temperature environments from the relationship with a junction temperature within the semiconductor elements. For this reason, the synchronous motor is limited in its use under high-temperature conditions since the Hall elements are used to detect the position of the rotor, and requires a protection structure against heat generated by the synchronous motor itself and a further special structure for arranging the Hall elements in the stator. Consequently, the motor is complicated in structure due to the above and other various factors, and the complicated structure is deterrent to a reduction in size of the motor.

To overcome the problem mentioned above, Japanese Patent Nos. 3256134 and 2903514 propose methods of detecting the direction of magnetic poles of a rotating rotor by supplying a high frequency detection signal to a separate detection winding provided in a motor winding, and processing a response to the high frequency detection signal. Also, Japanese Patent No. 3254005 proposes a method of detecting the direction of magnetic poles of a rotor by converting excitation power into vectors, and analyzing vector directions of a current and a voltage in an excited state.

However, the former method which involves the detection coil wound together with motor winding detects the influence of the magnetic poles of the rotor to the AC detection signal, and cannot therefore detect the direction of the magnetic poles unless the rotor is rotating at a proper angular velocity, i.e., cannot detect the polarity of the magnetic poles of the rotor when the rotor is at rest.

In the method which relies on the conversion of excitation power into vectors for control, when the rotation of the rotor is controlled at extremely low rotational speeds, an extremely small amount of reverse current is merely generated from each salient magnetic pole of the rotor which is rotating at such low angular velocities, and makes it difficult to discriminate the salient magnetic poles through the vector analysis on the excitation power including reverse power. Accordingly, the rotation of the rotor must be controlled with an open loop at low rotational speeds, but cannot occasionally be controlled with stability at low rotational speeds. Also, the salient magnetic poles present zero angular velocity when the rotor is at rest, so that any counter electromotive force is not generated in the exciting coil, leading to a disabled vector conversion. Thus, the rotor must be rotated at a proper angular velocity irrelevant to the rotation of motor to generate vibrations, and a response to the vibrations must be converted into a vector for determining the polarity of the magnetic poles of the rotor. As appreciated, a rotating angle of the rotor cannot be detected while the rotor is completely at rest.

SUMMARY OF THE INVENTION

The present invention has been made in view of the foregoing problems, and it is an object of the invention to provide a brushless synchronous motor which is capable of facilitating the detection of the position and polarity of a rotor, and a driving control apparatus therefor.

To achieve the above object, in one aspect, the present invention provides a brushless synchronous motor which includes a rotor shaped in a non-circular profile and having salient magnets arranged in a circumferential direction, a stator having driving magnetic poles arranged in the circumferential direction, and an exciting coil wound around each of the magnetic poles.

In the brushless synchronous motor described above, the rotor may include a cylindrical body having at least one flat surface perpendicular to one magnetic pole direction of the rotor, or a cylindrical body having an elliptic profile with a longer diameter in one magnetic pole direction of the rotor.

In another aspect, the present invention provides a driving control apparatus for the brushless synchronous motor, for detecting a magnetic pole direction of the rotor, and switching on/off a current supplied to the exciting coil and determining a direction in which the current flows at a proper rotational angular timing, to control the rotation of the rotor. The driving control apparatus includes a detector circuit connected to at least one of the exciting coil for generating a detection signal indicative of an impedance of the exciting coil in accordance with the distance between the driving magnetic poles and rotor.

In the driving control apparatus, the detector circuit may include a signal generator circuit for generating a high-frequency carrier signal, wherein the high-frequency carrier signal is supplied to the exciting coil to detect the impedance of the exciting coil for enabling a magnetic pole of the rotor to be discriminated.

The detector circuit may be connected to each of a predetermined number of the exciting coils, where a rotating angle of the rotor can be found during a period in which the rotor is at rest based on the detection signals generated from the respective detector circuits.

Alternatively, the detector circuit may be connected to each of a predetermined number of the exciting coils, where a rotating angle of the rotor can be found during a period in which the rotor is at rest based on the detection signals generated from the respective detector circuits, and power supplied to the respective exciting coils can be controlled based on the rotating angle.

DETAILED DESCRIPTION OF EMBODIMENTS

In the following, several embodiments of a brushless synchronous motor according to the present invention will be described in detail with reference to the accompanying drawings, where the same or similar components are designated the same reference numerals throughout all figures.

Figure 3:
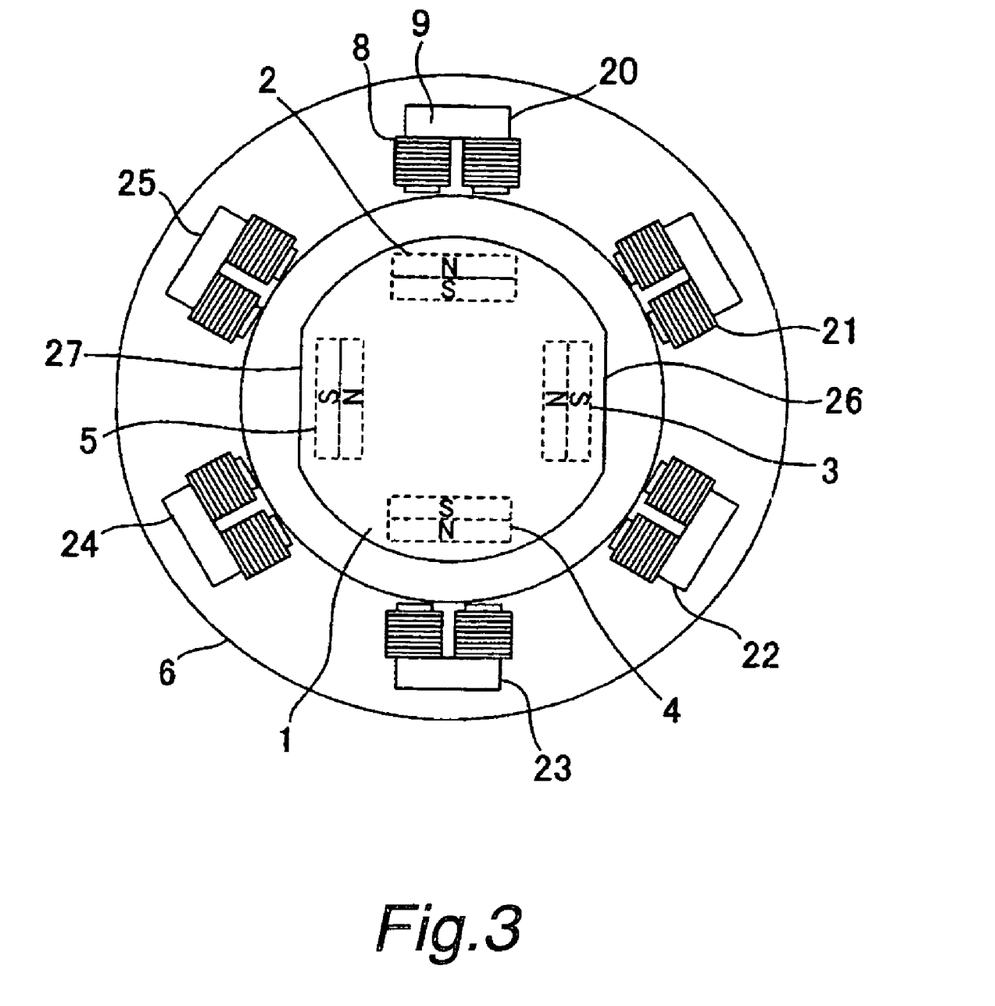
FIG. 3 is a diagram generally illustrating one embodiment of a brushless synchronous motor according to the present invention.

FIG. 3 is a diagram generally illustrating one embodiment of a brushless synchronous motor according to the present invention when it is implemented in an inner rotor type brushless synchronous motor. In FIG. 3, a rotor 1 is embedded with four driving salient magnets 2-5 arranged at angular intervals of 90 degrees such that N-poles and S-poles alternate in the circumferential direction, while a stator 6 is provided with six driving/position detection units 20-25 arranged at angular intervals of 60 degrees, each of which comprises an exciting coil 8 and a driving magnetic pole 9, in a manner similar to the conventional brushless synchronous motor illustrated in FIG. 1. In this structure, the rotor 1 is not completely cylindrical, but is formed with a pair of opposing flat surfaces 26, 27. For example, in FIG. 3, the flat surfaces 36, 37 are formed to be in parallel with magnetic surfaces of a pair of salient magnets 3, 5, which have S-poles positioned on the outer side, of pairs of opposing salient magnets, to constitute a two-pole synchronous motor. This results in a difference in the distance between the rotor 1 and stator 6 depending on the position.

It should be noted that since this embodiment employs a four-pole rotor, the flat surfaces 26, 27 are formed in opposition to the S-poles of two magnets, but such flat surfaces are not limited to one pair. For example, flat surfaces can be formed in opposition to an arbitrary number of S-poles from any one S-pole to all S-poles, provided that the rotor can rotate in a well balanced manner.

Figure 4A:
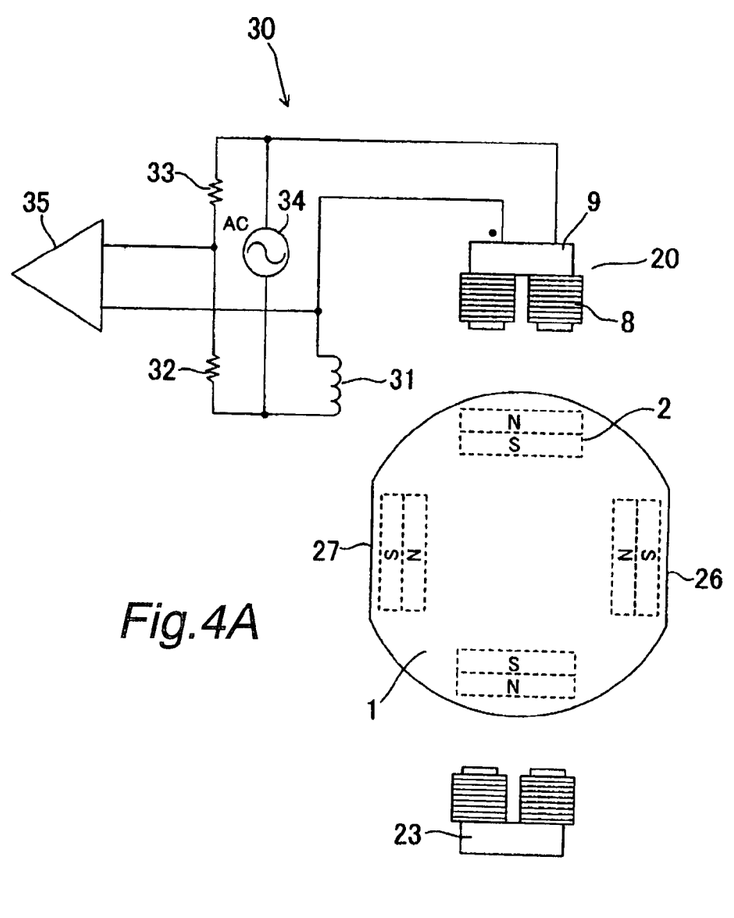
FIG. 4A is a diagram illustrating an exemplary configuration of an impedance detector circuit connected to an exciting coil in FIG. 3.

Referring now to FIGS. 4A, 4B, 5A, 5B, and 6, a description will be given of how to detect the position of magnetic poles of the rotor 1. FIG. 4A illustrates an exemplary circuit configuration of an impedance detector circuit 30 which is connected to the exciting coil 8 of an arbitrary driving/detection unit, for example, the driving/detection unit 20. The impedance detector circuit 30 comprises a four-terminal bridge circuit for detecting a change in impedance resulting from a change in inductance of the exciting coil 8, and magnetoelectrically converting the change in impedance. As illustrated, the exciting coil 8 is connected to a first side of the bridge circuit; a dummy coil 31 to a second side; a resistor 32 to a third side; and a resistor 33 to a fourth side. Further, a carrier signal generator circuit 34 for outputting a high-frequency carrier signal is connected across both ends of a series circuit made up of two resistors 32, 33 connected in series, and a signal converter circuit 35 is connected to intermediate points of the bridge circuit.

Figure 4B:
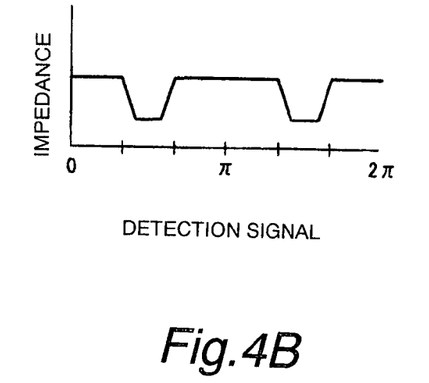
FIG. 4B is a graph showing an output signal of the impedance detector circuit.

FIG. 4B shows a detection signal indicative of the position of a magnetic pole, which is output by the signal converter circuit 34. Here, as the carrier signal generator circuit 34 is activated to supply a high-frequency carrier signal to the exciting coil 8, the signal converter circuit 35 is applied with the high-frequency carrier signal which has a magnitude corresponding to the impedance of the exciting coil 8. Then, the applied high-frequency carrier signal is rectified, amplified, and linearized in the signal converter circuit 35 to generate the detection signal indicative of the impedance of the exciting coil 8. FIG. 4B shows that the impedance of the exciting coil 8 drops due to the pair of parallel flat surfaces 26, 27 defined on the rotor 1 as the rotor 1 rotates every 180 degrees.

The impedance of the exciting coil 88 drops each time the rotor 1 rotates over 180 degrees because the gap between the driving magnetic pole 9 wound with the exciting coil 8 and the surface of the rotor 1 varies between a maximum value and a minimum value every 180 degrees during the rotation of the rotor 1. Specifically, as the high-frequency carrier signal is supplied from the carrier signal generator circuit 34 of the impedance detector circuit 30 to the exciting coil 8, the exciting coil 8 generates excited magnetic flux which forms a magnetic loop through the surface of the rotor 1. In this event, as the gap varies between the driving magnetic pole 9 and the surface of the rotor 1, the driving magnetic pole 9 experiences a change in permeability in the overall magnetic loop. This results in a change in apparent inductance of the exciting coil 8 which forms part of the bridge circuit of the impedance detector circuit 30. Consequently, the output from the intermediate points of the bridge circuit varies due to the change in impedance when the high-frequency carrier signal is applied to the exciting coil 8. This change is detected by the signal converter circuit 35 which then outputs a detection signal indicative of the change.

From the structure of the rotor 1 illustrated in FIG. 3, the drop in impedance appears in the detection signal output from the signal converter circuit 35 every 180 degrees along the rotating angle of the rotor 1 when the exciting coil 8 and driving magnetic pole 9 oppose an S-pole. Therefore, the magnetic pole can be discriminated by the detection signal.

Simultaneously, a change in impedance indicated by the detection signal corresponds to a change in the distance between the exciting coil 8 and the surface of the rotor 1 in opposition thereto, so that the magnetic pole detection signal shown in FIG. 4B also indicates the gap along the rotating angle of the rotor 1. This signal is similar to a signal generated by a general displacement sensor which may employ a high-frequency coil.

Figure 5A:
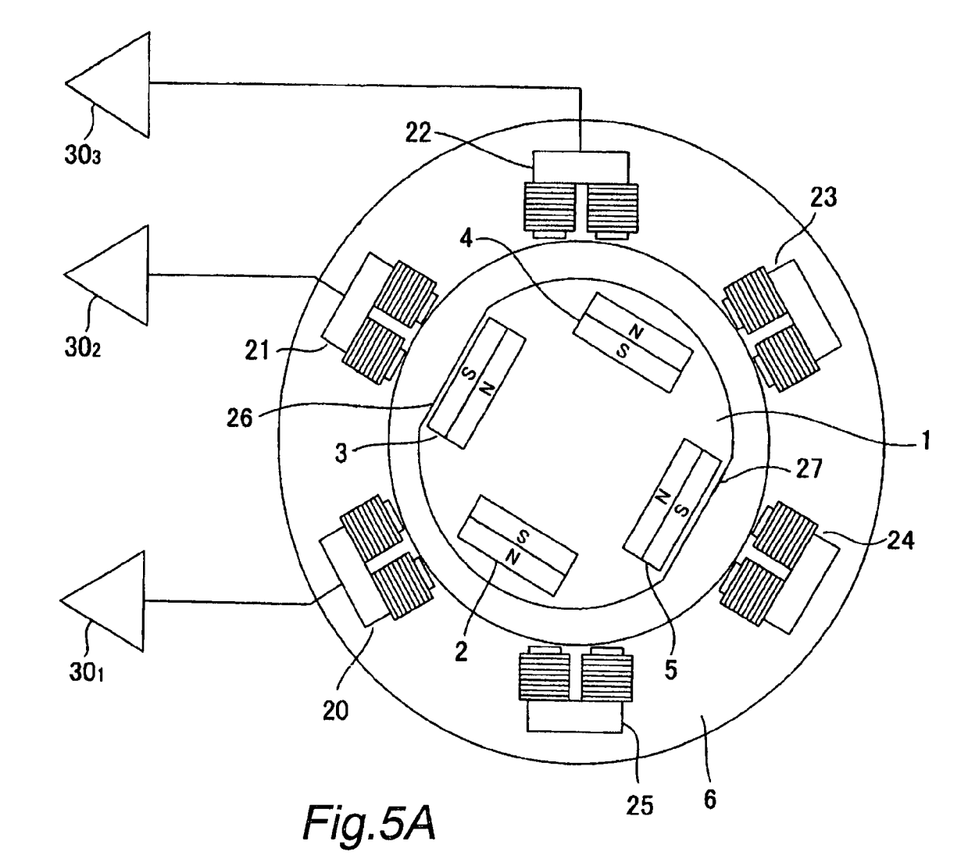
FIG. 5A is a diagram illustrating how the impedance detector circuits are connected to three exciting coils in FIG. 3.
Figure 5B:
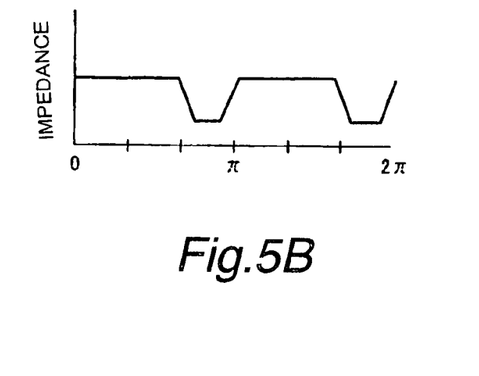
FIGS. 5B-5D are graphs each showing a detection signal output from each impedance detector circuit in FIG. 5A.
Figure 5C:
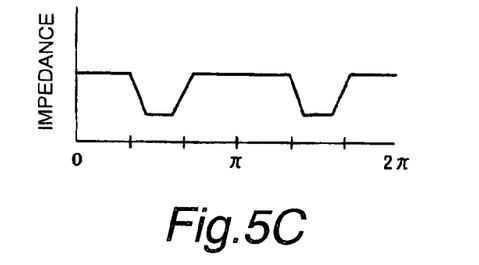
Figure 5D:
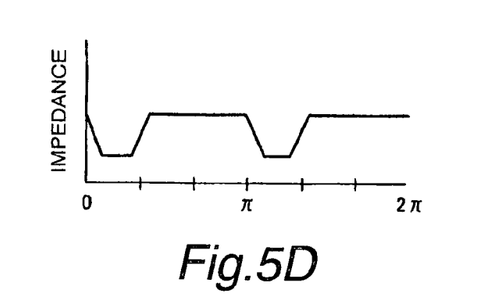

Accordingly, as illustrated in FIG. 5A, impedance detector circuits $30_1$, $30_2$, $30_3$, each having a similar configuration and performing similar operations to the impedance detector circuit 30 described above, are connected to three arbitrary adjacent ones of the six driving/detection units 20-25, for example, the driving/position detection units 20-22, as illustrated in FIG. 5A. Then, the signal converter circuits of the impedance detector circuits $30_1$, $30_2$, $30_3$ output detection signals shown in FIGS. 5B-5D, respectively, in accordance with the positional relationship between the salient magnets 2-5 of the rotor 1 and the driving/position detection units 20-22. These detection signals can be used to detect at which angular positions the S-poles of the rotor 1 lie within the stator at an arbitrary time.

Figure 6:
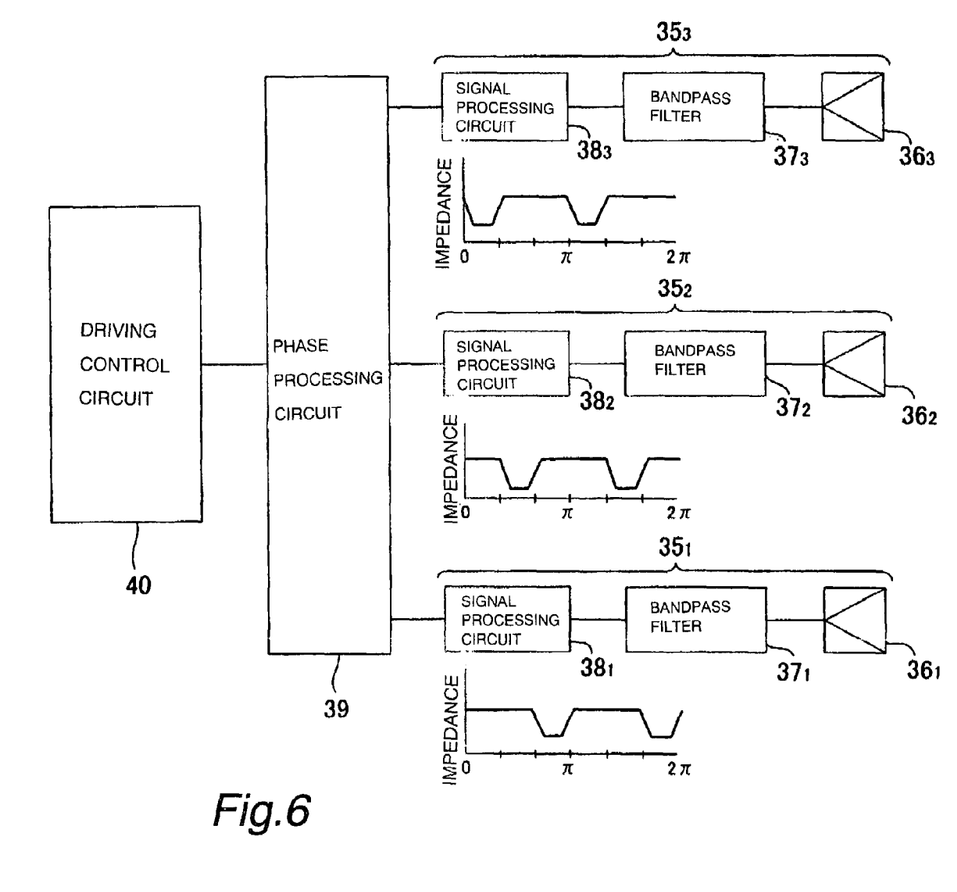
FIG. 6 is a block diagram illustrating an exemplary configuration of a signal converter circuit in the impedance detector circuit illustrated in FIG. 5A.

FIG. 6 illustrates an exemplary configuration of the signal converter circuits in the impedance detector circuits $30_1$, $30_2$, $30_3$ illustrated in FIG. 5A. All of these signal configuration circuits $35_1$, $35_2$, $35_3$ have the same configuration, and each comprise an amplifier $36_1$, $36_2$, $36_3$ applied with a carrier signal having a magnitude corresponding to the impedance of the associated exciting coil 8; a bandpass filter $37_1$, $37_2$, $37_3$ for removing unwanted noise; and signal processing circuit $38_1$, $38_2$, $38_3$ having a gain characteristic for facilitating processing at later stages. When the flat surfaces 36, 37 formed on the rotor 1 come to the position at which they oppose any of the driving/signal detection units 20-25, the impedance changes in the exciting coils 8 in those driving/detection units, causing the associated signal processing circuits $38_1$, $38_2$, $38_3$ to reduce their outputs in accordance with the changes in impedance. The detection signal output from each signal processing circuits $38_1$, $38_2$, $38_3$ is shown below the associated signal processing circuit, and corresponds to FIGS. 5B-5D, respectively.

The detection signals from the respective signal processing circuits $38_1$, $38_2$, $38_3$ are supplied to a phase processing circuit 39 which discriminates the phases of the supplied detection signals from one another. Specifically, the phase processing circuit 39 eventually determines where the flat surfaces 26, 27 detected by the driving/detection units 20-22, and hence the S-poles arranged in the rotor 1 are positioned within the rotating angle, stated another way, what degree the phase angle has. The phase angle thus determined is supplied to a driving control circuit 40 which determines which of the six exciting coils 8 arranged in the circumferential direction of the stator 6 is applied with a current in which direction and at which timing in accordance with the determined phase angle, in order to excite in an appropriate magnetic pole direction, thus exciting a predetermined exciting coil. This operation is performed every predetermined phase angle, and excitation power is sequentially supplied to the exciting coils to rotate the rotor 1 in the same direction and at the same speed as the rotating magnetic poles.

The impedance detector circuits $30_1$-$30_3$, phase processing circuit 39, and driving control circuit 40 make up the driving control apparatus for controlling the rotation of a brushless synchronous motor in FIG. 3.

In this event, the carrier signal generator circuit 34 preferably generates the high-frequency carrier signal at a frequency which is set sufficiently high with respect to the carrier frequency of the excitation power supplied to the exciting coils of the rotation driving circuits of the synchronous motor, and a rotational frequency of the rotor 1. This is because the positions of the magnetic poles of the rotor 1 can be identified by providing the inductance detection unit 30 with a function of extracting only the high-frequency carrier signal multiplexed on the excitation power even while the brushless synchronous motor is being driven.

The foregoing description has been made on how to detect the angular position of the rotating rotor 1 in a period in which the rotor 1 is rotating in connection with FIGS. 5A-5D. However, even while the rotor 1 is at rest, the rotational position can be detected for the rotor 1 before the start, because the detection signals are output from the signal processing circuits $38_1$, $38_2$, $38_3$ in accordance with the impedance of the exciting coils 8 defined in the positional relationship between the rotational position of the rotor 1 and the driving magnetic poles 9 by supplying the high-frequency carrier signal to the respective exciting coils 8. A predetermined current may be supplied to each exciting coil 8 based on the detected rotational position to start the rotor 1.

Thus, the rotational position of the rotor 1 can be detected in an arbitrary state from a state in which the brushless synchronous motor is at rest to a state in which it is rotating at high rotational speeds, thus making it possible to readily and exactly drive the brushless synchronous motor.

Figure 7:
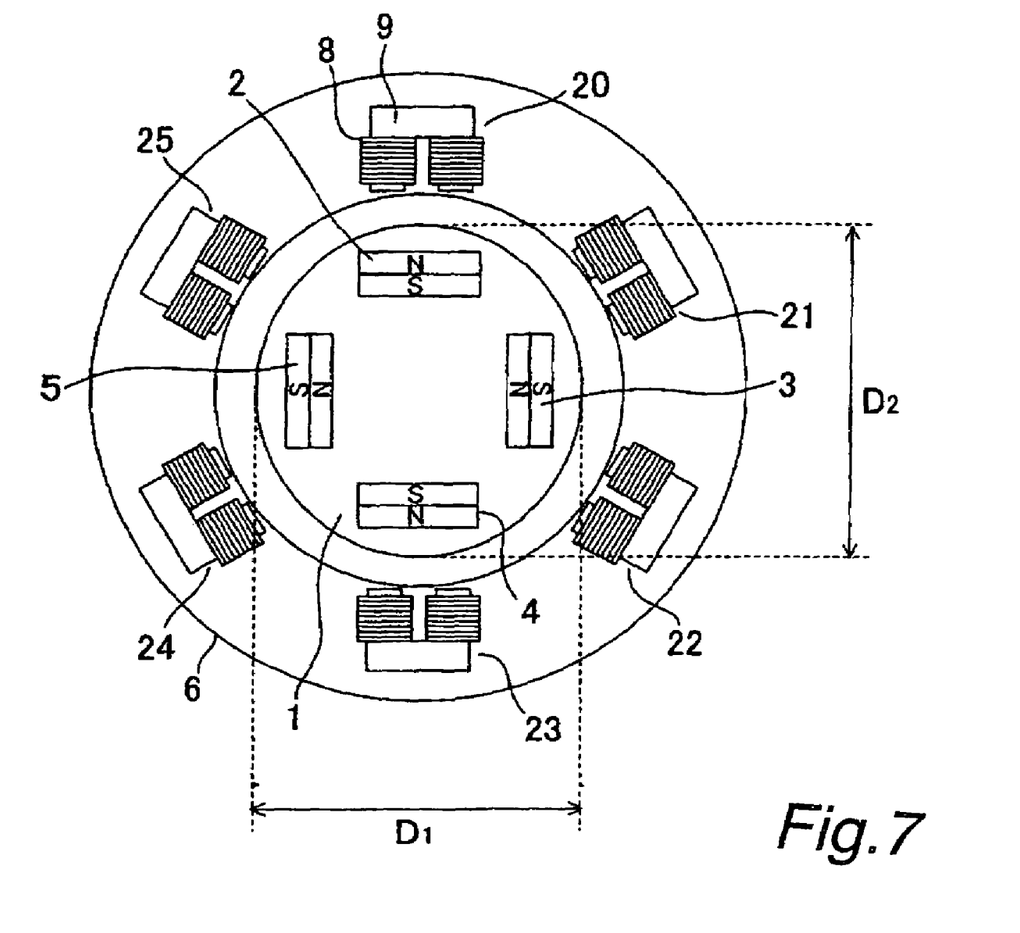
FIG. 7 is a diagram generally illustrating another embodiment of a brushless synchronous motor according to the present invention.

As will be understood from the description in connection with FIGS. 3-6, the present invention takes advantage of a change in the distance between the exciting coils 8 of the driving/position detection units 20-25 and the surface of the rotor 1. For providing such a change in the distance, the rotor 1 may be formed in a non-circular profile. FIG. 7 shows an example of such a rotor. In FIG. 7, the rotor 1 has an elliptic profile, wherein a diameter $D_1$ in an S-magnetic pole direction is shorter than a diameter $D_2$ in an N-magnetic pole direction. The rotor 1 made in such a profile can also provide similar effects to the embodiment described in connection with FIGS. 3-6.

While some embodiments of the brushless synchronous motor according to the present invention have been described in detail, the present invention is not limited to these embodiments, but a variety of alternations and modifications can be made thereto. For example, the embodiments relate to an inner rotor type brushless synchronous motor, but the present invention can be applied to an outer rotor type as well.

As will be understood from the description given of the embodiment of the brushless synchronous motor according to the present invention, the present invention can provide particular effects, by making the rotor in a non-circular profile, including:

(1) the ability to detect the angular position of the magnetic poles of the rotor in any arbitrary state from a resting state to a fast rotating state; and (2) the ability to control the rotation of the rotor at a low cost without the need for magnetic detecting means such as a magnetoelectric converting element which have been required before.

What is claimed is:

1. A driving control apparatus for a brushless synchronous motor comprising:

a rotor shaped in a non-circular profile and having salient magnets arranged in a circumferential direction, a stator having driving magnetic poles arranged in the circumferential direction, and an exciting coil wound around each of said magnetic poles, said control apparatus operable to detect a magnetic pole direction of said rotor, switch on/off a current supplied to said exciting coil and determine a direction in which the current flows at a proper rotational angular timing, to control the rotation of said rotor, said driving control apparatus comprising:

a detector circuit connected to at least one of said exciting coils for generating a detection signal indicative of an impedance of said exciting coil in accordance with the distance between said driving magnetic poles and said rotor.

2. A driving control apparatus according to claim 1, wherein said rotor comprises a cylindrical body having at least one flat surface perpendicular to one magnetic pole direction of said rotor.

3. A driving control apparatus according to claim 1, wherein said rotor comprises a cylindrical body having an elliptic profile with a longer diameter in one magnetic pole direction of said rotor.

4. A driving control apparatus according to claim 1, wherein said detector circuit comprises a signal generator circuit for generating a high-frequency carrier signal, and wherein said high-frequency carrier signal is supplied to said exciting coil to detect the impedance of said exciting coil for enabling a magnetic pole of said rotor to be discriminated.

5. A driving control apparatus according to claim 4, wherein said detector circuit is connected to each of a predetermined number of said exciting coils, and wherein a rotating angle of said rotor is found during a period in which said rotor is at rest based on the detection signals generated from said respective detector circuits.

6. A driving control apparatus according to claim 4, wherein said detector circuit is connected to each of a predetermined number of said exciting coils, and wherein a rotating angle of said rotor is found during a period in which said rotor is at rest based on the detection signals generated from said respective detector circuits, and power supplied to said respective exciting coils is controlled based on the rotating angle.

* * * * *